(12) United States Patent
Pourdeyhimi (10) Patent No.: US 11,787,152 B2
(45) Date of Patent: Oct. 17, 2023

(54) METHOD OF PREPARING A COMPOSITE SHEET

(71) Applicant: North Carolina State University, Raleigh, NC (US)

(72) Inventor: Behnam Pourdeyhimi, Cary, NC (US)

(73) Assignee: North Carolina State University, Raleigh, NC (US)

( * ) Notice: Subject to any disclaimer, the term of this patent is extended or adjusted under 35 U.S.C. 154(b) by 0 days.

(21) Appl. No.: 16/712,448

(22) Filed: Dec. 12, 2019

(65) Prior Publication Data

US 2020/0189230 A1 Jun. 18, 2020

Related U.S. Application Data

(60) Provisional application No. 62/779,070, filed on Dec. 13, 2018.

(51) Int. Cl.
| | |
|---|---|
| *D01D 5/084* | (2006.01) |
| *D01D 5/098* | (2006.01) |
| *D01F 6/04* | (2006.01) |
| *D01F 6/06* | (2006.01) |
| *D01F 6/14* | (2006.01) |
| *D01F 6/16* | (2006.01) |
| *D01F 6/60* | (2006.01) |

(Continued)

(52) U.S. Cl.
CPC .............. *B32B 5/26* (2013.01); *B29C 48/154* (2019.02); *B32B 5/022* (2013.01); *B32B 37/24* (2013.01); *D01D 4/025* (2013.01); *D01D 5/0985* (2013.01); *D01F 6/625* (2013.01); *D04H 3/011* (2013.01); *D04H 3/013* (2013.01); *D04H 3/08* (2013.01); *B32B 2037/0092* (2013.01); *B32B 2250/02* (2013.01); *B32B 2250/24* (2013.01); *B32B 2262/0276* (2013.01); *B32B 2262/062* (2013.01); *B32B 2305/10* (2013.01);

(Continued)

(58) Field of Classification Search
CPC . B29C 48/154; B29L 2031/7406; D01D 5/08; D01D 5/084; D01D 5/098; D01D 5/0985; D01F 6/04; D01F 6/06; D01F 6/14; D01F 6/16; D01F 6/60; D01F 6/62; D01F 6/625; D10B 2321/021; D10B 2321/022; D10B 2321/06; D10B 2321/08; D10B 2331/02; D10B 2331/04; D10B 2331/041
USPC ............ 264/171.23, 171.24, 173.11, 211.17, 264/331.11, 331.17, 331.19, 331.21, 555
See application file for complete search history.

(56) References Cited

U.S. PATENT DOCUMENTS

| 3,338,992 A | 8/1967 | Kinney |
| 3,341,394 A | 9/1967 | Kinney |

(Continued)

FOREIGN PATENT DOCUMENTS

GB 2267681 A * 12/1993 ............. D04H 13/00

OTHER PUBLICATIONS

Rasal, et al., "Toughness decrease of PLA-PHBHHx blend films upon surface-confined photopolymerization." Journal of Biomedical Materials Research Part A. vol. 88(3), pp. 1079-1086, (2009).

(Continued)

*Primary Examiner* — Leo B Tentoni
(74) *Attorney, Agent, or Firm* — Jenkins, Taylor, & Hunt, P.A.

(57) ABSTRACT

A composite sheet comprising two or more layers is described where the degree of abrasiveness of can be controlled. The sheet can comprise partially or wholly biodegradable or compostable materials or blends thereof. Methods of preparing the composite sheets are also described.

13 Claims, 5 Drawing Sheets

(51) Int. Cl.
*D01F 6/62* (2006.01)
*B32B 5/26* (2006.01)
*D04H 3/011* (2012.01)
*B32B 37/24* (2006.01)
*B32B 5/02* (2006.01)
*D01D 4/02* (2006.01)
*D04H 3/013* (2012.01)
*D04H 3/08* (2006.01)
*B29C 48/154* (2019.01)
*B32B 37/00* (2006.01)

(52) U.S. Cl.
CPC . *B32B 2307/538* (2013.01); *B32B 2307/7163* (2013.01); *B32B 2307/726* (2013.01); *B32B 2309/02* (2013.01); *B32B 2309/08* (2013.01); *B32B 2367/00* (2013.01); *B32B 2432/00* (2013.01); *D10B 2201/20* (2013.01); *D10B 2321/021* (2013.01); *D10B 2321/022* (2013.01); *D10B 2321/06* (2013.01); *D10B 2321/08* (2013.01); *D10B 2331/02* (2013.01); *D10B 2331/04* (2013.01); *D10B 2331/041* (2013.01)

(56) References Cited

U.S. PATENT DOCUMENTS

| | | | |
|---|---|---|---|
| 3,502,763 A | 3/1970 | Hartmann | |
| 3,542,615 A | 11/1970 | Dobo et al. | |
| 3,692,618 A | 9/1972 | Dorschner et al. | |
| 3,802,817 A | 4/1974 | Matsuki et al. | |
| 3,849,241 A | 11/1974 | Butin et al. | |
| 3,972,759 A | 8/1976 | Buntin | |
| 3,987,185 A | 10/1976 | Bare et al. | |
| 4,340,563 A | 7/1982 | Appel et al. | |
| 4,612,228 A | 9/1986 | Kato et al. | |
| 4,622,259 A | 11/1986 | McAmish et al. | |
| 4,659,609 A * | 4/1987 | Lamers | B32B 5/26 15/104.93 |
| 7,060,344 B2 | 6/2006 | Pourdeyhimi et al. | |
| 7,981,226 B2 | 7/2011 | Pourdeyhimi et al. | |
| 2006/0130252 A1* | 6/2006 | Brunner | A47L 13/16 15/224 |
| 2010/0196672 A1* | 8/2010 | Bonneh | B32B 5/06 428/174 |
| 2020/0070473 A1* | 3/2020 | Drews | B32B 5/269 |

OTHER PUBLICATIONS

Sin et al., "Polylactic Acid: PLA Biopolymer Technology and Applications." Elsevier Science, Waltham, MA. (2012).

Tsuji, H. "Poly (lactide) stereocomplexes: formation, structure, properties, degradation, and applications." Macromolecular bioscience. vol. 7(5), pp. 569-597, (2005).

Xiao et al., "Poly(lactic acid)-based biomaterials: synthesis, modification and applications." InTechOpen.com. (2012).

Auras et al.,(2011) "Poly(lactic acid): Synthesis, Structures, Properties, Processing, and Applications." Wiley, Hoboken, NJ.

* cited by examiner

FIG. 4B

METHOD OF PREPARING A COMPOSITE SHEET

RELATED APPLICATIONS

This application is based on and claims the benefit of U.S. Provisional Patent Application Ser. No. 62/779,070, filed Dec. 13, 2018, the disclosure of which is incorporated herein by reference in its entirety.

TECHNICAL FIELD

The presently disclosed subject matter relates to composite sheets comprising two or more layers wherein the degree of abrasiveness of the sheet can be controlled by the composite structure, as well as to methods of producing composite sheets. The sheets can comprise partially or wholly biodegradable or compostable materials or blends thereof.

Abbreviations

° C.=degrees Celsius
%=percentage
μm=microns (or micrometer)
DCT=die to collector distance
g=grams
HDT=heat distortion (or deflection) temperature
hr=hours
m=meters
min=minutes
mm=millimeter
PB=polybutylene
PBS=poly(butylene succinate)
PBT=polybutylene terephthalate
PCL=polycaprolactone
PE=polyethylene
PET=polyethylene terephthalate
PGA=polyglycolide
PHA=polyhydroxyalkanoate
PHB=poly-3-hydroxybutyrate
PLA=polylactic acid
PP=polypropylene
PTT=polytrimethylene terephthalate
PVA=polyvinyl acetate
PVOH=polyvinyl alcohol
$T_g$=glass transition temperature
$T_m$=melting temperature

BACKGROUND

Synthetic fibers are widely used in a number of diverse applications to provide stronger, thinner, and lighter weight products. Nonwoven fabrics, in turn, are widely used as components of a variety of articles, including without limitation absorbent personal care products, such as diapers, incontinence pads, feminine hygiene products, and the like; medical products, such as surgical drapes, sterile wraps, and the like; filtration devices; interlinings; wipes; furniture and bedding construction; apparel; insulation; packaging materials; and others.

Wipes, for example, are used in both consumer and industrial applications and are often composed of a cellulose component (pulp, lyocell, cotton, etc.) and a thermoplastic fiber (polypropylene, polyester, nylon, etc.). Scrubbers, such as those commercially available under the registered tradename SCOTCHBRITE®, are similar, except that abrasive or friction particles are attached to the surface of the fibers. Others are simply composed of a spunbond polyester or polypropylene and pulp entangled together with waterjets. Recent developments in flushable wipes often use a combination of pulp together with man-made cellulosic fibers such as lyocell (including fibers sold under the tradename TENCEL™ (Lenzing Aktiengesellschaft, Lenzing, Austria)) in a wetlay process. These are the only compostable structures currently on the market. However, they behave much the same as paper products. For instance, they can be weak, have a uniform thin structure, and are designed mostly as a wet wipe.

Accordingly, there is an ongoing need for additional composite products, such as those that can be used as wipes for various consumer and industrial applications. In particular, there is a need for composite sheets that can be tailored to have particular abrasive properties and/or that can be compostable or biodegradable.

SUMMARY

The presently disclosed subject matter provides, in some embodiments, a method of preparing a composite sheet, the method comprising: providing a base layer, wherein the base layer comprises a first polymer, wherein the first polymer is a natural or synthetic polymer; and meltblowing a second polymer onto a first surface of the base layer to form a first abrasive layer comprising meltblown fibers of the second polymer, wherein the meltblown fibers have a diameter ranging from about 0.3 microns (μm) and about 20 μm. In some embodiments, the second polymer is a compostable or biodegradable polymer or polymer blend.

In some embodiments, the method further comprises meltblowing a third polymer onto a second surface of the base layer to form a second abrasive layer comprising meltblown fibers of the third polymer, wherein the third polymer is the same or different than the second polymer, and wherein the meltblown fibers of the second abrasive layer have a diameter ranging from about 0.3 μm and about 20 μm. In some embodiments, the meltblown fibers of the second abrasive layer have a different diameter than the meltblown fibers of the first abrasive layer. In some embodiments, the third polymer is a compostable or biodegradable polymer or polymer blend.

In some embodiments, the base layer comprises or consists of cellulose. In some embodiments, the cellulose comprises pulp, lyocell, cotton or a blend thereof. In some embodiments, the base layer comprises between about 10 grams per square meter (g/m²) and about 150 g/m² cellulose. In some embodiments, the base layer comprises between about 25 g/m² and about 55 g/m² cellulose.

In some embodiments, the first polymer is selected from the group comprising polylactic acid (PLA), polypropylene (PP), polyethylene (PE), polyvinyl alcohol (PVOH), polyvinyl acetate (PVA), polycaprolactone (PCL), polyglycolide (PGA), poly(butylene succinate) (PBS), a polyhydroxyalkanoate (PHA), poly-3-hydroxybutyrate (PHB) and copolymers and blends thereof. In some embodiments, the first polymer is a compostable or biodegradable polymer.

In some embodiments, the base layer comprises a plurality of multicomponent spunbond fibers. In some embodiments, the multicomponent spunbond fibers have a diameter of greater than about 0.3 μm and less than about 30 μm.

In some embodiments, the base layer comprises a structure selected from the group comprising a nonwoven web, a woven fabric, a knitted fabric, a braided fabric, or a combination thereof. In some embodiments, the base layer is provided by carding, airlay, wetlay, spunbonding, or meltblowing, and bonded by thermal bonding, chemical bonding, mechanical bonding, or any combination thereof.

In some embodiments, the second polymer is selected from the group comprising PLA, PE, PP, PVOH, PVA, PCL, PBS, PHA, PHB, PGA, polybutylene (PB), nylon, thermoplastic elastomers, and copolymers and blends thereof. In some embodiments, the second polymer is selected from the group comprising PLA, PBS, PHA, PCL, PHB, PGA, copolymers, and blends thereof. In some embodiments, the second polymer is PLA.

In some embodiments, the meltblown fibers in the first abrasive layer have a diameter ranging from about 0.3 µm and about 10 µm. In some embodiments, the meltblown fibers in the first abrasive layer have a diameter ranging from about 0.3 µm and about 5 µm. In some embodiments, the first abrasive layer comprises between about 1 g/m² and about 30 g/m² of the second polymer. In some embodiments, the first abrasive layer comprises between about 5 g/m² and about 15 g/m² of the second polymer.

In some embodiments, the meltblowing is performed using nozzles having a diameter ranging from about 180 µm and about 600 µm and/or a nozzle density ranging from about 10 per inch and about 75 per inch. In some embodiments, the meltblowing is performed using a die to collector distance (DCD) of between about 50 millimeters (mm) to 300 mm. In some embodiments, the meltblowing is performed using a DCD of about 150 mm. In some embodiments, the meltblowing is performed at a temperature of between about 200° C. and about 300° C.

In some embodiments, the presently disclosed subject matter provides a composite sheet prepared according to a method comprising: providing a base layer, wherein the base layer comprises a first polymer, wherein the first polymer is a natural or synthetic polymer; and meltblowing a second polymer onto a first surface of the base layer to form a first abrasive layer comprising meltblown fibers of the second polymer, wherein the meltblown fibers have a diameter ranging from about 0.3 µm and about 20 µm. In some embodiments, all the materials of the sheet are compostable or biodegradable.

In some embodiments, the presently disclosed subject matter provides a wipe comprising a composite sheet prepared according to a method comprising: providing a base layer, wherein the base layer comprises a first polymer, wherein the first polymer is a natural or synthetic polymer; and meltblowing a second polymer onto a first surface of the base layer to form a first abrasive layer comprising meltblown fibers of the second polymer, wherein the meltblown fibers have a diameter ranging from about 0.3 µm and about 20 µm. In some embodiments, the wipe is a consumer wipe, a household wipe, an industrial wipe and/or a medical wipe. In some embodiments, the wipe is a baby wipe. In some embodiments, the wipe is impregnated with a solution. In some embodiments, the solution comprises a cleaning and/or sterilizing agent.

In some embodiments, the presently disclosed subject matter provides a composite sheet comprising at least two layers: (a) a base layer comprising a polymeric web, wherein the polymeric web comprises a first polymer; and (b) a first abrasive layer comprising polymer fibers of a second polymer adhered to a first surface of the base layer, wherein the polymer fibers have a diameter ranging from about 0.3 µm and about 20 µm; and wherein the composite sheet is free of an adhesive to adhere the polymer fibers to the base layer. In some embodiments, the base layer comprises or consists of cellulose. In some embodiments, the cellulose comprises pulp, lyocell, cotton, or a blend thereof.

In some embodiments, the base layer comprises between about 10 g/m² and about 150 g/m² cellulose. In some embodiments, the base layer comprises between about 25 g/m² and about 55 g/m² cellulose.

In some embodiments, the first polymer is selected from the group comprising PLA, PP, PE, PVOH, PVA, PCL, PGA, PBS, PHA, PHB, and copolymers or blends thereof. In some embodiments, the base layer comprises or consists of a compostable or biodegradable polymer. In some embodiments, the base layer comprises a plurality of multicomponent polymer fibers. In some embodiments, the multicomponent fibers have a diameter of greater than about 0.3 µm and less than about 30 µm. In some embodiments, the base layer comprises a structure selected from the group comprising nonwoven web, a woven fabric, a knitted fabric, a braided fabric, and a combination thereof.

In some embodiments, the second polymer is selected from the group comprising PLA, PE, PP, PVOH, PVA, PCL, PBS, PHA, PHB, PGA, polybutylene (PB), nylon, thermoplastic elastomers, and copolymers and blends thereof. In some embodiments, the second polymer is selected from the group comprising PLA, PBS, PHA, PCL, PHB, PGA, copolymers, and blends thereof. In some embodiments, the second polymer is PLA.

In some embodiments, the fibers in the first abrasive layer have a diameter ranging from about 0.3 µm and about 10 µm. In some embodiments, the fibers in the first abrasive layer have a diameter ranging from about 0.3 µm and about 5 µm. In some embodiments, the first abrasive layer comprises between about 1 g/m² and about 30 g/m² of the second polymer. In some embodiments, the first abrasive layer comprises between about 5 g/m² and about 15 g/m² of the second polymer.

In some embodiments, the composite sheet further comprises a second abrasive layer comprising polymer fibers of a third polymer adhered to a second surface of the base layer, wherein the polymer fibers have a diameter ranging from about 0.3 µm and about 20 µm, wherein the third polymer is the same as or different than the second polymer, and wherein the composite sheet is free of an adhesive to adhere the polymer fibers of the second abrasive layer to the base layer. In some embodiments, the third polymer is selected from the group comprising PLA, PE, PP, PVOH, PVA, PCL, PBS, PHA, PHB, PGA, PB, nylon, thermoplastic elastomers, and copolymers and blends thereof. In some embodiments, the third polymer is selected from the group comprising PLA, PBS, PHA, PCL, PHB, PGA, copolymers, and blends thereof. In some embodiments, the third polymer is PLA.

In some embodiments, the first abrasive layer and the second abrasive layer have different levels of abrasiveness. In some embodiments, the diameter of the polymer fibers of the first abrasive layer and the diameter of the polymer fibers of the second abrasive layer are different. In some embodiments, all the materials of the composite sheet are compostable or biodegradable.

In some embodiments, the composite sheet is impregnated with a solution. In some embodiments, the solution comprises a cleaning agent and/or sterilizing agent.

In some embodiments, the presently disclosed subject matter provides a wipe comprising a composite sheet comprising at least two layers: (a) a base layer comprising a polymeric web, wherein the polymeric web comprises a first polymer; and (b) a first abrasive layer comprising polymer fibers of a second polymer adhered to a first surface of the base layer, wherein the polymer fibers have a diameter ranging from about 0.3 µm and about 20 µm; and wherein the composite sheet is free of an adhesive to adhere the polymer fibers to the base layer. In some embodiments, the wipe is a consumer wipe, a household wipe, an industrial wipe and/or a medical wipe. In some embodiments, the wipe is a baby wipe.

Thus, it is an object of the presently disclosed subject matter to provide composite sheets and methods of preparing composite sheets.

An object of the presently disclosed subject matter having been stated herein above, and which is achieved in whole or in part by the presently disclosed subject matter, other objects will become evident as the description proceeds when taken in connection with the accompanying Figures as best described herein below.

BRIEF DESCRIPTION OF THE FIGURES

Having thus described the present disclosure in general terms, reference will now be made to the accompanying drawings, which are not necessarily drawn to scale.

DETAILED DESCRIPTION

The presently disclosed subject matter now will be described more fully hereinafter. The presently disclosed subject matter may, however, be embodied in many different forms and should not be construed as limited to the embodiments set forth herein; rather, these embodiments are provided so that this disclosure will be thorough and complete, and will fully convey the scope of the presently disclosed subject matter to those skilled in the art.

I. Definitions

While the following terms are believed to be well understood by one of ordinary skill in the art, the following definitions are set forth to facilitate explanation of the presently disclosed subject matter.

All technical and scientific terms used herein, unless otherwise defined below, are intended to have the same meaning as commonly understood by one of ordinary skill in the art. References to techniques employed herein are intended to refer to the techniques as commonly understood in the art, including variations on those techniques or substitutions of equivalent techniques that would be apparent to one of skill in the art. While the following terms are believed to be well understood by one of ordinary skill in the art, the following definitions are set forth to facilitate explanation of the presently disclosed subject matter.

Definitions of specific functional groups and chemical terms are those that would be understood by one of ordinary skill in the art. For purposes of this disclosure, the chemical elements are identified in accordance with the Periodic Table of the Elements, CAS version, Handbook of Chemistry and Physics, $75^{th}$ Ed., inside cover, and specific functional groups are generally defined as described therein. Additionally, general principles of organic chemistry, as well as specific functional moieties and reactivity, are described in Thomas N. Sorrell (2006) *Organic Chemistry, $2^{nd}$ Edition*, University Science Books, South Orange, N.J.; Smith & March (2001) *March's Advanced Organic Chemistry*, 5th Edition, John Wiley & Sons, Inc., New York; Larock (1989) *Comprehensive Organic Transformations*, VCH Publishers, Inc., New York; Carruthers (1987) *Some Modern Methods of Organic Synthesis, $3^{rd}$ Edition, Cambridge University Press, Cambridge*, 1987; the entire contents of each of which are incorporated herein by reference.

Following long-standing patent law tradition, the terms "a", "an", and "the" are meant to refer to one or more as used herein, including the claims. For example, the phrase "a solvent" can refer to one or more solvents. Also as used herein, the term "another" can refer to at least a second or more.

Unless otherwise indicated, all numbers expressing quantities of ingredients, reaction/processing conditions, size, and so forth used in the specification and claims are to be understood as being modified in all instances by the term "about". Accordingly, unless indicated to the contrary, the numerical parameters set forth in this specification and attached claims are approximations that can vary depending upon the desired properties sought to be obtained by the presently disclosed subject matter.

The term "about", as used herein when referring to a measurable value such as an amount of weight, time, pressure, diameter, length, etc., is meant to encompass variations of in some embodiments ±20%, in some embodiments ±10%, in some embodiments, ±5%, in some embodiments ±1%, and in some embodiments ±0.1% from the specified amount, as such variations are appropriate to perform the disclosed methods.

The use of the term "or" in the claims is used to mean "and/or" unless explicitly indicated to refer to alternatives only or the alternatives are mutually exclusive.

As used herein, the term "and/or" when used in the context of a listing of entities, refers to the entities being present singly or in combination. Thus, for example, the phrase "A, B, C, and/or D" includes A, B, C, and D individually, but also includes any and all combinations and subcombinations of A, B, C, and D.

As used herein, the words "comprising" (and any form of comprising, such as "comprise" and "comprises"), "having" (and any form of having, such as "have" and "has"), "including" (and any form of including, such as "includes" and "include"), or "containing" (and any form of containing, such as "contains" and "contain") are inclusive or open-ended and do not exclude additional, unrecited elements or method steps.

For the recitation of numeric ranges herein, each intervening number there between with the same degree of precision is explicitly contemplated. For example, for the range of 6-9, the numbers 7 and 8 are contemplated in addition to 6 and 9, and for the range 6.0-7.0, the number 6.0, 6.1, 6.2, 6.3, 6.4, 6.5, 6.6, 6.7, 6.8, 6.9, and 7.0 are explicitly contemplated.

The term "polymer" as used herein refers to a substance comprising a macromolecule. Polymers include both natural polymers (e.g., proteins, cellulose, etc.) and synthetic polymers. In some embodiments, the term "polymer" can include both oligomeric molecules and molecules with larger numbers (e.g., >10, >20, >50, >100) of repetitive units. In some embodiments, "polymer" refers to macromolecules with at least 10 repetitive units.

As used herein, a "macromolecule" refers to a molecule of high relative molecular mass, the structure of which comprises the multiple repetition of units derived from molecules of low relative molecular mass, e.g., monomers and/or oligomers.

As used herein, a "monomer" refers to a molecule that can undergo polymerization, thereby contributing constitutional units, i.e., an atom or group of atoms, to the essential structure of a macromolecule.

An "oligomer" as used herein can refer to a molecule of intermediate relative molecular mass, the structure of which comprises a small plurality (e.g., 2, 3, 4, 5, 6, 7, 8, 9, or 10) of repetitive units derived from molecules of lower relative molecular mass.

A "copolymer" refers to a polymer derived from more than one species of monomer.

The term "biodegradable" as used herein refers to polymeric materials that can break down (e.g., via the action of microbes) to form monomeric materials.

In some embodiments, the biodegradable polymer is also compostable. The term "compostable" as used herein refers to biodegradable materials that breakdown over a period of from about one week to about several months to form compounds that can act as soil nutrients.

As used herein, the term "fiber" is defined as a basic element of nonwovens and other fabrics which has a high aspect ratio of, for example, at least about 100 times. In addition, "filaments/continuous filaments" are continuous fibers of extremely long lengths that possess a very high aspect ratio. "Staple fibers" are cut lengths from continuous filaments. Therefore, as used herein, the term "fiber" is intended to include fibers, filaments, continuous filaments, staple fibers, and the like. The term "multicomponent fibers" refers to fibers that comprise two or more components that are different by physical or chemical nature, including bicomponent fibers.

The fibers according to the presently disclosed subject matter can vary, and include fibers having any type of cross-section, including, but not limited to, circular, rectangular, square, oval, triangular, and multilobal. In certain embodiments, the fibers can have one or more void spaces, wherein the void spaces can have, for example, circular, rectangular, square, oval, triangular, or multilobal cross-sections. The fibers can be selected from single-component (i.e., uniform in composition throughout the fiber) or multicomponent fiber types including, but not limited to, fibers having a sheath/core structure and fibers having an islands-in-the-sea structure, as well as fibers having a side-by-side, segmented pie, segmented cross, segmented ribbon, or tipped multilobal cross-sections.

Fiber diameter is a common means of describing fibers with a circular cross-section. In the case of trilobal cross-sections, for example, the longest fiber dimension would be along an edge forming the trilobal cross-section. In the case of ribbon fibers, for example, the cross-section would have two distinct measures (width and thickness). The presently disclosed subject matter can use fibers of any cross-sectional shape and have a size of about 100 microns or less in diameter (e.g., a round cross-section fiber of about 80 microns in diameter) or wherein at least one of the principal dimension is about 100 microns or less (e.g., a ribbon fiber of about 100 microns×about 10 microns).

II. Biodegradable/Compostable Polymers

Polylactic Acid (PLA), an aliphatic polyester derived from natural products, such as corn starch, is a biodegradable and compostable polymer. Since the 1970's, PLA materials have been approved by the US Food and Drug Administration (FDA) for direct use in containers for substances intended for human consumption. The final products of PLA degradation are water and carbon dioxide, which are non-toxic to human beings, as well as to the ecosphere. Hence it can be produced as any one-off product that comes in direct contact with humans, including food containers, cups, spoons, knives. For example, due to its compostability, it has been used for single use applications, such as tea and coffee bags, hygiene products, and the like. Moreover, contributing to its processability, PLA can be formed into any desired shape, including film, board, pellets and fibers, by extrusion, injection pleating, thermoforming, hot drawing, and solvent casting.[1] Due its ease of synthesis and processing, PLA can be less energy-consuming than many other polymers, consequently reducing air and water pollution.[2]

PLA has a lower melting temperature compared to other polyesters. For instance, PLA homopolymer has a glass transition temperature ($T_g$) around 55° C., and melting temperature ($T_m$) around 175° C. However, thermal properties such as $T_g$ and $T_m$, and mechanical properties such as tensile and breaking strength, are affected by the polymer structure. The differences in molecular weight, crystalline structure (i.e. crystalline, semi crystalline, amorphous) and tacticity can lead to differences in properties.[3]

PLA is known to have issues with thermal stability (shrinkage). PLA is brittle, showing low elongation strain at breaking point. Unless modified, it cannot be used as a proper substitute for applications requiring good elongation.[4] In addition, the heat distortion temperature (HDT) is around 55-65° C. for most pure PLA homopolymers, narrowing and limiting their utilization range.[5] When PLA is exposed to hot aqueous environments, the low HDT can cause deformation of the material.

Ahlstrom introduced tea bags made from spunbond PLA about a decade or so ago and recently, PLA has been used to form coffee pods. To overcome the challenges with PLA, however, many have resorted to the use of plasticizers and additives to create stable structures. These structures are typically heavy (80 to 120 g/m$^2$). The fibers are often greater than 25 to 30 microns in diameter.

Other polymers, such as polyhydroxyalkanoates (PHA), poly-3-hydroxybutyrate (PHB), poly(butylene succinate) (PBS), polycaprolactone (PCL), and polyglycolide (PGA), are also biodegradable, but typically are not currently used in forming nonwovens. Materials such as PLA, PGA, PCL, PBS and others often can only be used as fibers and this implies that they can be formed into spunbond structures due to their high viscosity and high molecular weight. However, in meltblowing, these materials can fail because the die pressure is too high due to their viscosity and they fail to produce fibers of reasonable strength and flexibility. The presently disclosed subject matter addresses these issues with these materials.

III. Meltblowing

Meltblowing is a process wherein a polymer (or polymers) is melted to a liquid state and extruded through a linear die containing numerous (e.g., several hundred or more) small orifices. As the polymer is extruded, streams of hot air are rapidly blown at the polymer, quickly stretching and/or attenuating the extruded polymer streams to form fine filaments. The air streams typically stretch or attenuate the molten polymer by many orders of magnitude. The stretched polymer fibers can be collected as a randomly entangled, self-bonded nonwoven web. The technique of meltblowing is known in the art and is discussed in various patents, for example, U.S. Pat. No. 3,849,241 to Butin, U.S. Pat. No. 3,987,185 to Buntin et al., U.S. Pat. No. 3,972,759 to Buntin, and U.S. Pat. No. 4,622,259 to McAmish et al., each of which is herein incorporated by reference in its entirety.

Meltblowing is generally capable of providing fibers with relatively small diameters. Diameter and other properties of meltblown fibers can be tailored by modifying various process parameters (e.g., die design, polymer throughput, air characteristics, collector placement, and web handling). Attenuating the air pressure affects fiber size, as higher pressures typically yield finer fibers (e.g., up to about 5 microns, such as about 1-5 microns) and lower pressures yield coarser fibers (e.g., up to about 30 microns, such as about 10-30 microns). In some embodiments of the presently disclosed subject matter, a base layer of a composite sheet and/or an abrasive layer of a composite sheet can comprise a nonwoven web comprising meltblown fibers having average diameters in the range of about 1 micron to about 10 microns, e.g., about 2 microns to about 5 microns. In some embodiments, the mean flow pore size of a meltblown nonwoven web can be about 20 microns or less, about 10 microns or less, about 8 microns or less, about 5 microns or less, about 2 microns or less, or about 1 micron or less. In some embodiments, the meltblown fibers can comprise single component fibers.

The meltblowing process can use three major inputs for controlling the structure of the nonwovens being formed. These inputs are throughput, air and die to collector distance (DCD). Throughput can contribute to fiber size and can be measured in grams/hole/minute. The dies can have 30-75 holes per inch, for example, and this throughput can dictate the total fiber production per hour per meter.

Air can also affect fiber size and can be measured in volume of air consumed which can be measured in cubic meters per hour per meter ($m^3$/hr per meter or $m^3$/m/hr). The higher the air consumption, the higher the air velocity, which can result in higher drawing of the fibers. A conventional meltblowing unit can have air as low as 300 $m^3$/hr per meter and as high as 2000 $m^3$/hr per meter. The volume of air as well as the mass flow rate per capillary can control the fiber size. Typically, higher air consumption can provide smaller diameter fibers.

The Die to Collector Distance (DCD) measured in millimeters is responsible for the bulk of the resulting structure and its extent of fiber to fiber bonding. Low DCD results in flat and membrane like structures and the high DCD results in bulky structures that are quite soft and conformal.

Allowing the spinneret and collector to be too close, i.e., a low DCD, can result in fibers that are partially solidified and therefore, can adhere to another substrate/sheet that is passed below the die if the two materials are compatible. In some embodiments, a DCD range of 100 mm to 500 mm can provide a reasonable range for forming structures.

For example, a conventional meltblown made from polypropylene (PP) can be prepared at the higher end of the air consumption range and the distance from the nozzle to the collecting surface can be, for example, >200 mm at a throughput of 0.5 to 0.7 g/hole/min. The fibers produced can be in the range of 2 microns to 5 microns in diameter. The polymer normally has a melt flow index of about 400 and higher for producing said fibers. The high melt flow index can be attributed to a low molecular weight of the polymer and consequently, the structure can be weaker and less extensible. Even at low attenuation rates, the fabrics can exhibit low strength and low extensibility.

According to one aspect of the presently disclosed subject matter, these features are used to form a composite nonwoven structure that is comprised of two or more materials to form a sheet that is soft and absorbent on one side and abrasive on the other. Alternatively, both sides can be abrasive with different degrees of abrasiveness while the mid layer is absorbent and soft. The structure can be made wholly from biodegradable or compostable materials.

IV. Composite Sheets and Methods of Producing Composite Sheets

Figure 1:
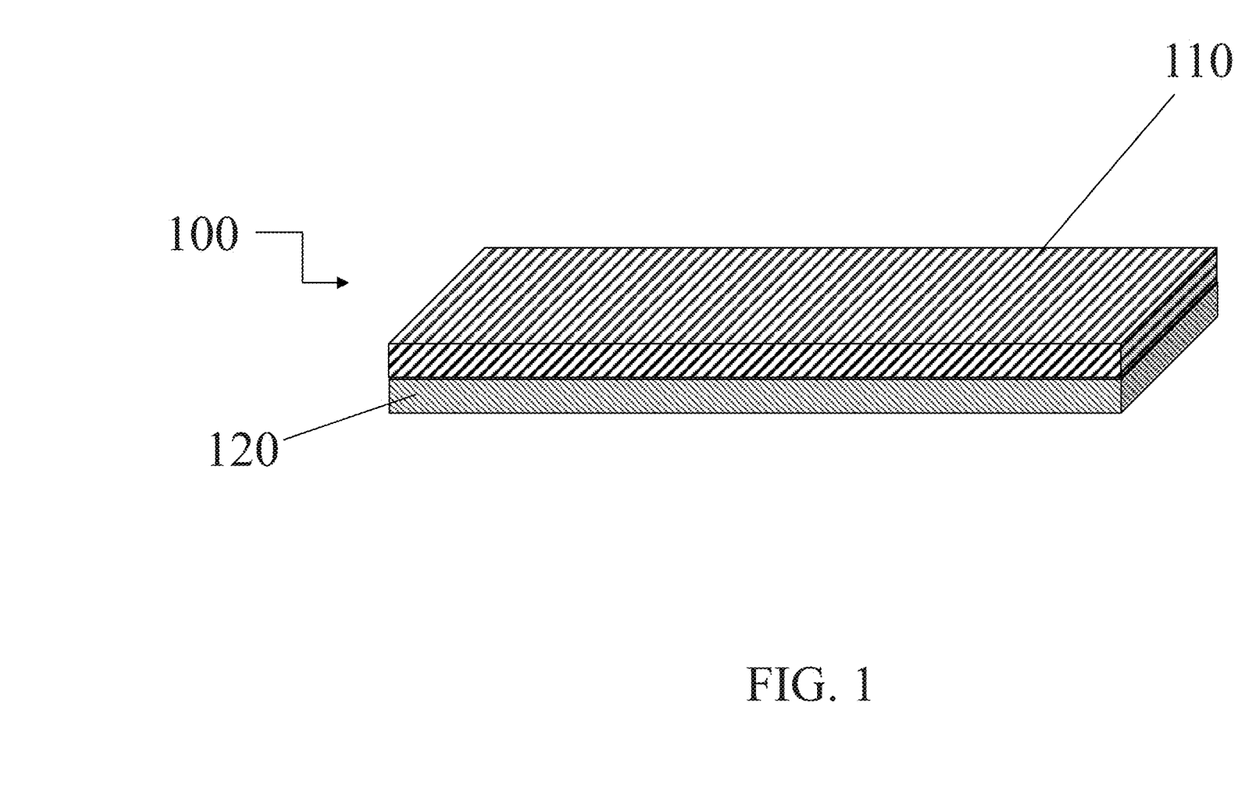
FIG. 1 is a schematic drawing of an exemplary composite sheet of the presently disclosed subject matter having an abrasive layer of meltblown fiber on one side of an absorbent base layer.
Figure 2:
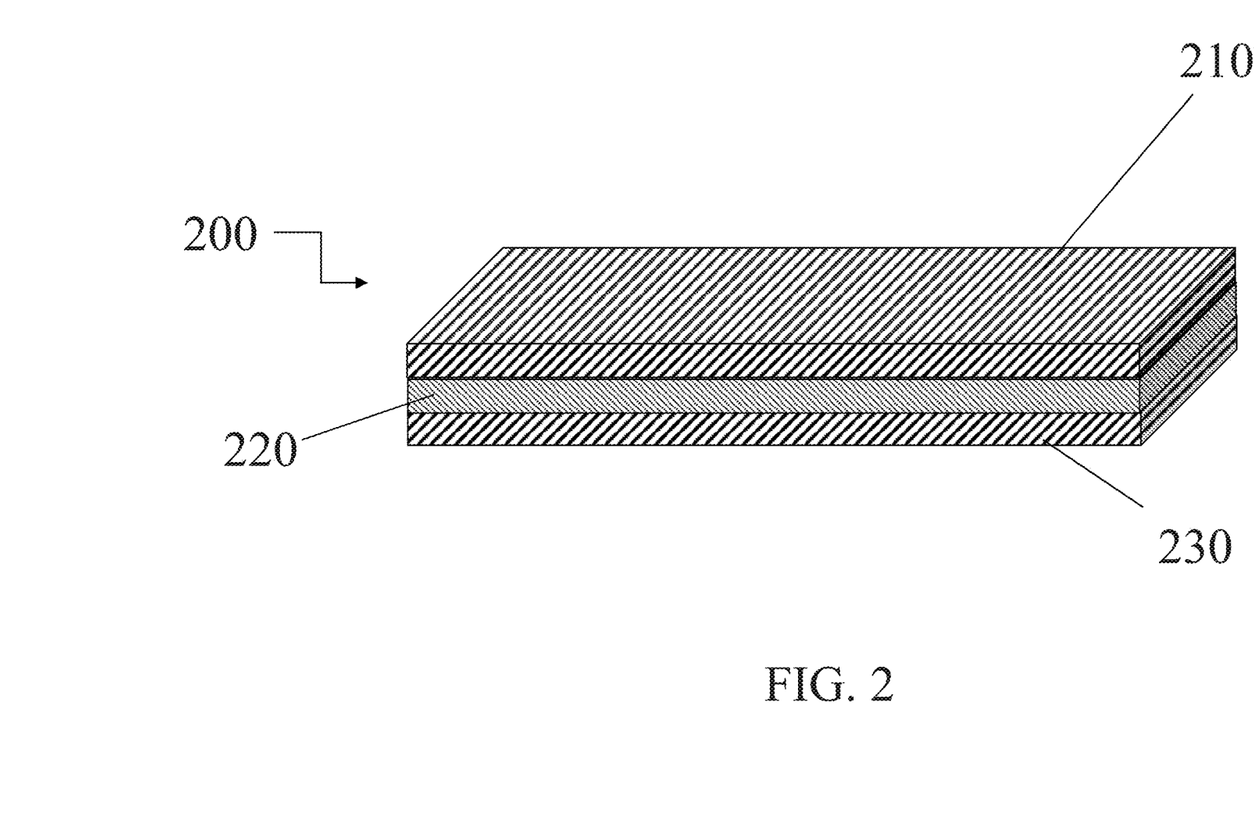
FIG. 2 is a schematic drawing of an exemplary composite sheet of the presently disclosed subject matter having an abrasive layer of meltblown fibers on both sides of an absorbent base layer.
Figure 3:
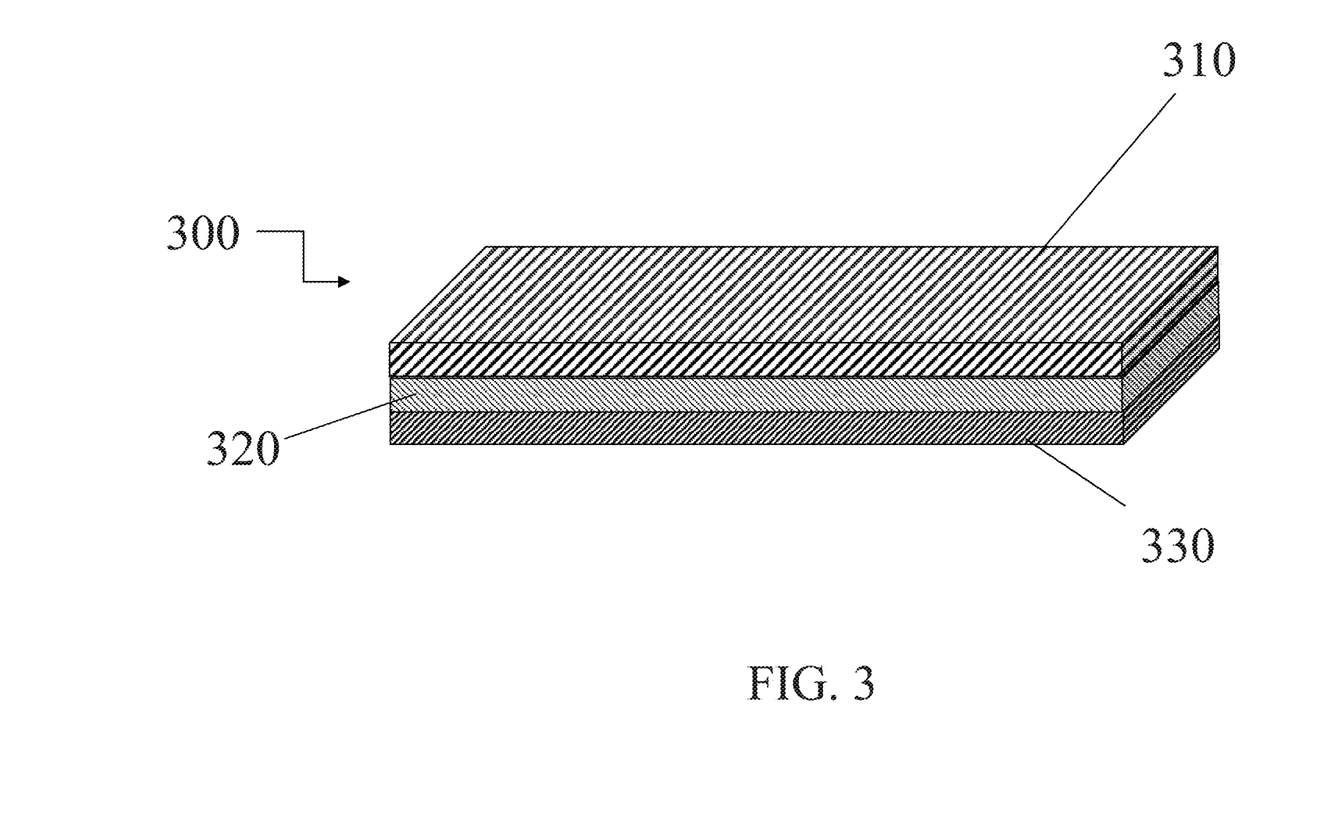
FIG. 3 is a schematic drawing of an exemplary composite sheet of the presently disclosed subject matter having an abrasive layer of meltblown fibers on both sides of an absorbent base layer, wherein the two abrasive layers have different levels of abrasiveness.

In some embodiments, the presently disclosed subject matter provides a composite sheet comprising at least two layers. In some embodiments, at least one layer (e.g., a base layer) comprises a compostable or biodegradable fabric structure, optionally comprising filaments or staple fibers having a diameter of any suitable size below 20 microns (μm). Although nonwoven fabrics are preferred, the base layer of the presently disclosed composite sheets can also be formed from knitted, braided or woven webs. The composite sheet can also include at least one abrasive layer comprising polymer fibers (e.g., meltblown polymer fibers) adhered to a surface of the base layer. The composite can be free of an adhesive to adhere the polymer fibers of the abrasive layer to the base layer. In some embodiments, one or more aspects of meltblowing the fibers can be controlled to provide for the adherence of the fibers to the base layer Exemplary composite sheet structures are shown in FIGS. 1, 2, and 3. FIG. 1, for example, shows two layer sheet structure 100, where absorbent base layer 120 (e.g., a cellulose based nonwoven, comprising or consisting of, for example, pulp, cotton, lyocell (including fibers sold under the tradename TENCEL™ (Lenzing Aktiengesellschaft, Lenzing, Austria)), or blends thereof) is "coated" with abrasive layer 110, which can comprise thermoplastic (e.g., biodegradable thermoplastic, such as PLA, PBS, PCL, PGA, polyvinyl alcohol (PVOH), or combinations thereof) meltblown fibers, wherein the meltblown fibers of abrasive layer 110 are larger than those used in absorbent base layer 120.

Advantageously, the meltblown fibers can have an average diameter of less than about 30 microns or less than about 20 microns. In some embodiments, the diameter of the meltblown fibers can range between about 0.3 μm and about 20 μm. In some embodiments, the diameter of the meltblown fibers can range between about 1.0 μm and about 20 μm. In some embodiments, the meltblown fibers have an average diameter greater than about 5 microns but less than about 20 microns. In some embodiments, the diameter of the meltblown fibers can range between about 1.0 μm and about 5.0 μm. In some embodiments, the diameter of the meltblown fibers can range between about 3 μm and about 14 μm, between about 3 μm and about 10 μm, or between about 5 μm and about 12 μm. In some embodiments, the diameter of the meltblown fibers can range between about 8 μm and about 20 μm or between about 12 μm and about 20 μm.

FIG. 2 shows three-layer sheet structure 200 where absorbent base layer 220 (e.g., a cellulose based nonwoven base layer, comprising or consisting of, for example, pulp, cotton, lyocell (including fibers sold under the tradename TENCEL™ (Lenzing Aktiengesellschaft, Lenzing, Austria)), or blends thereof) is "coated" on both sides with an abrasive layer of meltblown fibers where the meltblown fibers are larger than those used in absorbent base layer 220. Abrasive layers 210 and 230 can comprise, for instance, biodegradable thermoplastic (e.g., PLA, PBS, PCL, PGA, PVOH, or combinations thereof) meltblown fibers. Both abrasive layer 210 and abrasive layer 230 have a similar meltblown fiber structure and therefore, a similar degree of abrasiveness.

FIG. 3 shows three-layer sheet structure 300 where absorbent base layer 320 (e.g., a cellulose based nonwoven absorbent base layer comprising or consisting of pulp, cotton, lyocell (including fibers under the tradename TENCEL™ (Lenzing Aktiengesellschaft, Lenzing Austria)), or blends thereof) is "coated" on both sides with an abrasive layer of meltblown fibers. Abrasive layers 310 and 330 can comprise biodegradable thermoplastic (e.g., PLA, PBS, PCL, PGA, PVOH, or combinations thereof) meltblown fibers. The meltblown fibers of abrasive layers 310 and 330 are different in size compared to those used in absorbent base layer 320. In addition, abrasive layers 310 and 330 have different meltblown fiber structure compared to one another, and, therefore, a dissimilar degree of abrasiveness.

The fibers of the nonwoven base layer can be in any arrangement. Generally, the fibers are provided in a somewhat random arrangement. Although the present disclosure focuses on nonwoven webs, it is noted that the fibers described herein can also be used to manufacture traditional woven fabrics that can be used in place of, or in addition to, a nonwoven web.

The term "nonwoven" as used herein in reference to fibrous materials, webs, mats, batts, or sheets refers to fibrous structures in which fibers are aligned in an undefined or random orientation. The nonwoven fibers are initially presented as unbound fibers or filaments, which can be natural or man-made. The manufacturing of nonwovens can involve binding the various fibers or filaments together. The manner in which the fibers or filaments are bound can vary, and include thermal, mechanical and chemical techniques that are selected in part based on the desired characteristics of the final product. In certain embodiments, the preferred nonwoven materials are those with a random fiber orientation distribution.

Spunbonding can employ various types of fiber spinning process (e.g., wet, dry, melt, or emulsion). Melt spinning is most commonly used, wherein a polymer is melted to a liquid state and forced through small orifices into cool air, such that the polymer strands solidify according to the shape of the orifices. The fiber bundles thus produced are then drawn, i.e., mechanically stretched (e.g., by a factor of 3-5) to orient the fibers. A nonwoven web is then formed by depositing the drawn fibers onto a moving belt. General spunbonding processes are described, for example, in U.S. Pat. No. 4,340,563 to Appel et al., U.S. Pat. No. 3,692,618 to Dorschner et al., U.S. Pat. No. 3,802,817 to Matsuki et al., U.S. Pat. Nos. 3,338,992 and 3,341,394 to Kinney, U.S. Pat. No. 3,502,763 to Hartmann, and U.S. Pat. No. 3,542,615 to Dobo et al., each of which is incorporated herein by reference in its entirety. Spunbonding typically produces a larger diameter filament than meltblowing, for example. For example, in some embodiments, spunbonding produces fibers having an average diameter of about 20 microns or more. In some embodiments of the presently disclosed subject matter, the base layer comprises spunbound fibers having average diameters in the range of about 15 to about 25 e.g., about 15 to about 20 microns.

Various methods are available for processing multicomponent fibers to obtain fibers having smaller diameters (e.g., less than about 5 microns, less than about 2 microns, less than about 1 micron, less than about 0.5 microns, less than about 0.3 microns, or even less). Although these methods are commonly applied to spunbonded materials, which typically have larger diameters, it is noted that they can also be applied to meltblown materials as well as fibrous materials prepared by other means. For example, in some embodiments, splittable multicomponent fibers are produced (e.g., including but not limited to, segmented pie, ribbon, islands in the sea, or multilobal) and subsequently split or fibrillated to provide two or more fibers having smaller diameters. The means by which such fibers can be split can vary and can include various processes that impart mechanical energy to the fibers, such as hydroentangling. Exemplary methods for this process are described, for example, in U.S. Pat. No. 7,981,226 to Pourdeyhimi et al., each of which is incorporated herein by reference in its entirety.

In some embodiments, multicomponent fibers are produced and subsequently treated (e.g., by contacting the fibers with a solvent) to remove one or more of the components. For example, in certain embodiments, an island— in a sea fiber can be produced and treated to dissolve the sea component, leaving the islands as fibers with smaller diameters. Exemplary methods for this type of process are described, for example, in U.S. Pat. No. 4,612,228 to Kato et al., which is incorporated herein by reference in its entirety.

After production of the fibers and deposition of the fibers onto a surface, the nonwoven web can, in some embodiments, be subjected to some type of bonding (including, but not limited to, thermal fusion or bonding, mechanical entanglement, chemical adhesive, or a combination thereof), although in some embodiments, the web preparation process itself provides the necessary bonding and no further treatment is used. In some embodiments, the base layer is bonded thermally using a calendar or a thru-air oven. In other embodiments, the base layer is subjected to hydroentangling, which is a mechanism used to entangle and bond fibers using hydrodynamic forces. The term "hydroentangled" as applied to a nonwoven fabric herein defines a web subjected to impingement by a curtain of high speed, fine water jets, typically emanating from a nozzle jet strip accommodated in a pressure vessel often referred to as a manifold or an injector. This hydroentangled fabric can be characterized by reoriented, twisted, turned and entangled fibers. For example, the fibers can be hydroentangled by exposing the nonwoven web to water pressure from one or more hydroentangling manifolds at a water pressure in the range of about 10 bar to about 1000 bar. In some embodiments, needle punching is utilized, wherein needles are used to provide physical entanglement between fibers.

Selection of the bonding technique (or techniques) can in some embodiments be dictated by the ultimate application of the nonwoven web. For example, if a nonwoven web is to be used for filtering large particles, it can in some embodiments be made using spunbonded fibers that are randomly interlocked. If a nonwoven fabric is needed to filter smaller particles, then it can in some embodiments be made from meltblown fibers, which are typically bonded during the meltblowing process.

The fibrous webs thus produced can have varying thicknesses. The process parameters can be modified to vary the thickness. For example, in some embodiments, increasing the speed of the moving belt onto which fibers are deposited results in a thinner web. Average thicknesses of the nonwoven webs can vary and, in some embodiments, the base layer of the presently disclosed subject matter can have an average thickness of about 1 mm or less. Additionally, the stiffness of the structure can be controlled by employing larger diameter fibers and/or a higher basis weight. In some embodiments, the basis weight of the base layer is about 500 g/m$^2$ or less, about 400 g/m$^2$ or less, about 300 g/m$^2$ or less, about 200 g/m$^2$ or less, about 100 g/m$^2$ or less, or about 50 g/m$^2$ or less. In certain embodiments, the base layer has a basis weight of about 10 g/m$^2$ to about 150 g/m$^2$, 75 g/m$^2$ to about 125 g/m$^2$, or about 25 g/m$^2$ to about 55 g/m$^2$. The basis weight of a fabric can be measured, for example, using test methods outlined in ASTM D 3776/D 3776M-09ae2 entitled "Standard Test Method for Mass Per Unit Area (Weight) of Fabric." This test reports a measure of mass per unit area and is measured and expressed as grams per square meter (g/m$^2$).

With regard to nonwoven base layers, higher porosities can be achieved by using thicker fibers, however, the overall flexibility of the structure will also be reduced, making it more difficult to cut. Therefore, attributes of the nonwoven fabric and fibers can be balanced to achieve the desired resilience, porosity and flexibility. As an alternative means for nonwoven web formation, fibers can be extruded, crimped, and cut into staple fibers from which a web can be formed and then bonded by one or more of the methods described above. In some embodiments, staple or filament fibers can be used to form woven, knitted or braided structures as well. In another embodiment of the presently disclosed subject matter, staple nonwoven fabrics can be constructed by spinning fibers, cutting them into short segments, and assembling them into bales. The bales can then be spread in a uniform web by a wetlaid process, airlaid process, or carding process and bonded as described above.

Processes that can be adapted for use in the presently disclosed subject matter are described, for example, in U.S. Pat. No. 7,060,344 to Pourdeyhimi et al., which is herein incorporated by reference in its entirety. The accompanying figures illustrate embodiments of products and processes used for making composite structures with preferred or controlled degree of abrasiveness. The manufacturing can begin with a specific substantially planar nonwoven web. These nonwoven webs are then stabilized.

In various embodiments of the presently disclosed subject matter, the fibers comprising the base layer can be homocomponent, bicomponent, or multicomponent; and they can be, for example in a tipped trilobal, side by side, wedge, islands-in-the-sea, or sheath/core configuration. In some embodiments, the base layer comprises one or more homocomponent meltblown fibers wherein each of the one or more fibers has a diameter of about 2 microns to about 5 microns. In certain embodiments, the base layer comprises one or more multicomponent spunbound fibers wherein each of the one or more fibers has a diameter of about 15 microns to about 20 microns. In some embodiments, the base layer is a single layer or multilayer composite made up of one or more spunbound or meltblown structures.

The base layer can comprise multicomponent fibers comprising a polyamide, polypropylene or polybutylene terephthalate combined with one or more additional thermoplastic polymers, or a fiber blend comprising a polyamide, polypropylene or polybutylene terephthalate blended with one or more additional thermoplastic polymers. The fibers can comprise blends of polyesters/co-polyesters used together with "meltblown" grade polypropylenes. The addition of meltblown grade polypropylene can allow for the formation of a hybrid structure that can also be electrostatically charged to higher charge density. In some embodiments, each of the plurality of fibers comprises least about 50%, or about 60%, or about 70%, or about 80%, by weight of a polyamide, polypropylene, polybutylene terephthalate, or a combination thereof. In some embodiments, the nonwoven can comprise one or more fibers comprising at least one of polyamides, polybutylene terephthalate (PBT), polypropylene, polytrimethylene terephthalate (PTT), polyethylene, polyethylene terephthalate (PET), co-polyesters, and combinations thereof. In some embodiments, the nonwoven comprises a plurality of fibers, wherein each of the plurality of fibers comprises a thermoplastic fiber selected from the group consisting of nylon 6, nylon 6,6, polybutylene terephthalate (PBT), polypropylene, polyethylene, and combinations thereof. The nonwoven can comprise a plurality of fibers, wherein at least about 50%, or at least about 60%, or at least about 70%, or at least about 80%, by weight of each of the plurality of fibers is a thermoplastic polymer selected from the group consisting of polyamides, polybutylene terephthalate (PBT), poly(butylene succinate) PBS, polyethylene in combination with PBT, and combinations thereof.

In some embodiments, the presently disclosed subject matter provides a method of preparing a composite sheet providing a base layer, wherein the base layer comprises a first polymer, wherein the first polymer is a natural or synthetic polymer; and meltblowing a second polymer onto a first surface of the base layer to form a first abrasive layer comprising meltblown fibers of the second polymer. In some embodiments, the method further comprises meltblowing a third polymer onto a second surface of the base layer to form a second abrasive layer comprising meltblown fibers of the third polymer. The meltblown fibers can have a diameter ranging from between about 0.3 µm and about 20 µm (e.g., about 0.3, 0.5, 0.7, 1.0, 1.5, 2.0, 2.5, 3.0, 3.5, 4.0, 4.5, 5.0, 5.5, 6.0, 6.5, 7.0, 7.5, 8.0, 8.5, 9.0, 9.5, 10.0, 10.5, 11.0, 11.5, 12.0, 12.5, 13.0, 13.5, 14.0, 14.5, 15.0, 15.5, 16.0, 16.5, 17.0, 17.5, 18.0, 18.5, 19.0, 19.5, or 20.0 µm). In some embodiments, the meltblown fibers of the first abrasive layer and the meltblown fibers of the second abrasive layer can have the same diameter or average diameter. In some embodiments, the meltblown fibers of the first abrasive layer and the meltblown fibers of the second abrasive layer can have a different diameter or average diameter. In some embodiments, one or both of the second and third polymer is a compostable or biodegradable polymer or polymer blend (e.g., selected from the group including, but not limited to, PLA, PVOH, PVA, PCL, PGA, PBS, PHA, and PBS).

The base layer can comprise any suitable polymer or polymer blend. In some embodiments, the base layer comprises or consists of cellulose. For example, the base layer can comprise between about 10 grams per square meter (g/m$^2$) and about 150 g/m$^2$ cellulose (e.g., about 10, 20, 30, 40, 50, 60, 70, 80, 90, 100, 110, 120, 130, 140, or about 150 g/m$^2$ cellulose). In some embodiments, the base layer comprises between about 25 g/m$^2$ and about 55 g/m$^2$ cellulose.

The cellulose can be one or more of pulp, lyocell (including fibers sold under the tradename TENCEL™ (Lenzing Aktiengesellschaft, Lenzing, Austria)), cotton, or a blend thereof. Alternatively, in some embodiments, the first polymer is selected from the group including, but not limited to, PLA, polypropylene (PP), polyethylene (PE), PVOH, PVA, PCL, PGA, PBS, PHA, PHB, and copolymers and blends thereof. In some embodiments, the first polymer is a compostable or biodegradable polymer. In some embodiments, the base layer comprises multicomponent spunbond fibers (e.g., having a diameter of greater than about 0.3 μm and less than about 30 μm).

In some embodiments, the base layer comprises a structure selected from the group including, but not limited to, a nonwoven web, a woven fabric, a knitted fabric, a braided fabric, or a combination thereof. In some embodiments, the base layer is a nonwoven web, such as described hereinabove. In some embodiments, the base layer is provided by carding, airlay, wetlay, spunbonding, or meltblowing. In some embodiments, the base layer is bonded by thermal bonding, chemical bonding, mechanical bonding, or any combination thereof. In some embodiments, the base layer is a commercially available wipe (e.g., an absorbent consumer or industrial wipe).

The second and third polymers can be independently selected from the group including, but not limited to, PLA, PE, PP, PVOH, PVA, PCL, PBS, PHA, PHB, PGA, polybutylene (PB), nylon, thermoplastic elastomers, and copolymers and blends thereof. In some embodiments, one or both of the second polymer and the third polymer is selected from the group comprising PLA, PBS, PHA, PCL, PHB, PGA, copolymers, and blends thereof. In some embodiments, the second and/or third polymer is PLA.

In some embodiments, the meltblown fibers in the first and/or second abrasive layer have a diameter ranging from about 0.3 μm and about 10 μm (e.g., about 0.3, 0.5, 0.7, 1.0, 1.5, 2.0, 2.5, 3.0, 3.5, 4.0, 4.5, 5.0, 5.5, 6.0, 6.5, 7.0, 7.5, 8.0, 8.5, 9.0, 9.5, or about 10.0 μm). In some embodiments, the meltblown fibers in the first and/or second abrasive layer can have a diameter from about 0.3 μm and about 5 μm. In some embodiments, the meltblown fibers in one of the first and second abrasive layers can have a diameter of between about 8 μm and about 20 μm (e.g., between about 10 μm and about 16 μm) and the meltblown fibers in the other of the first and second abrasive layers can have a diameter ranging from about 0.5 μm and about 10 μm.

In some embodiments, each abrasive layer can comprise between about 1 g/m² and about 30 g/m² of the second or third polymer (e.g., about 1, 5, 10, 15, 20, 25 or 30 g/m² of the second or third polymer). In some embodiments, each abrasive layer can comprise between about 5 g/m² and about 15 g/m² of the second or third polymer.

In some embodiments, an abrasive layer or layers of the presently disclosed composite sheets can be prepared via meltblowing using a nozzle density of between about 10 per inch and about 75 per inch (e.g., about 10, 15, 20, 25, 30, 35, 40, 45, 50, 55, 60, 65, 70, or 75 per inch). In some embodiments, the nozzle can have a diameter between about 180 μm and about 600 μm (e.g., about 180, 200, 220, 240, 260, 280, 300, 320, 340, 360, 380, 400, 420, 440, 460, 480, 500, 520, 540, 560, 580, or about 600 μm).

In some embodiments, an abrasive layer or layers of the presently disclosed composite sheets can be prepared via meltblowing using a DCD of between about 50 mm and about 300 mm (e.g., about 50, 60, 70, 80, 90, 100, 110, 120, 130, 140, 150, 160, 170, 180, 190, 200, 210, 220, 230, 240, 250, 260, 270, 280, 290, or 300 mm). In some embodiments, the DCD is about 150 mm. In some embodiments, the meltblowing is performed at a temperature of between about 200° C. and about 300° C. (e.g., about 200, 210, 220, 230, 240, 250, 260, 270, 280, 290, or about 300° C.).

Figure 4A:
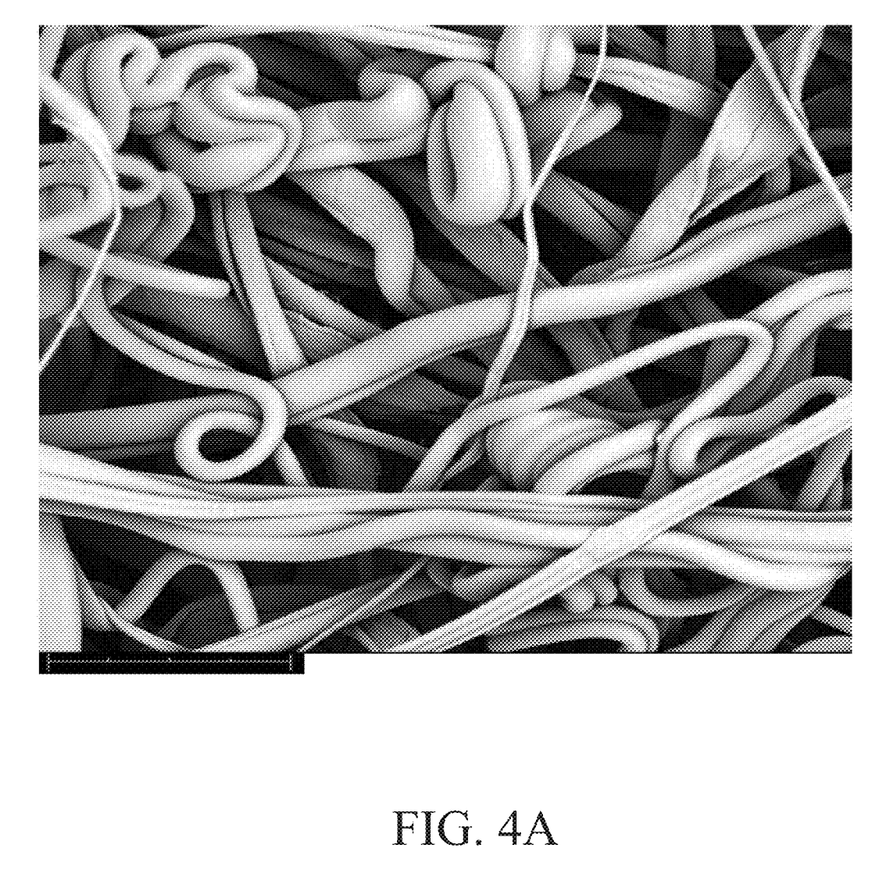
FIG. 4A is a microscopic image of an abrasive layer of meltblown fibers of polylactic acid (PLA) meltblown using an air consumption of 800 cubic meters per meter per hour ($m^3$/m/hr) and adhered to a cotton base layer. The weight of the base layer was 45 grams per square meter ($g/m^2$) and the weight of the PLA abrasive layer was 15 $g/m^2$. The scale bar in the lower left of the image represents 80 micrometers ($\mu m$).
Figure 4B:
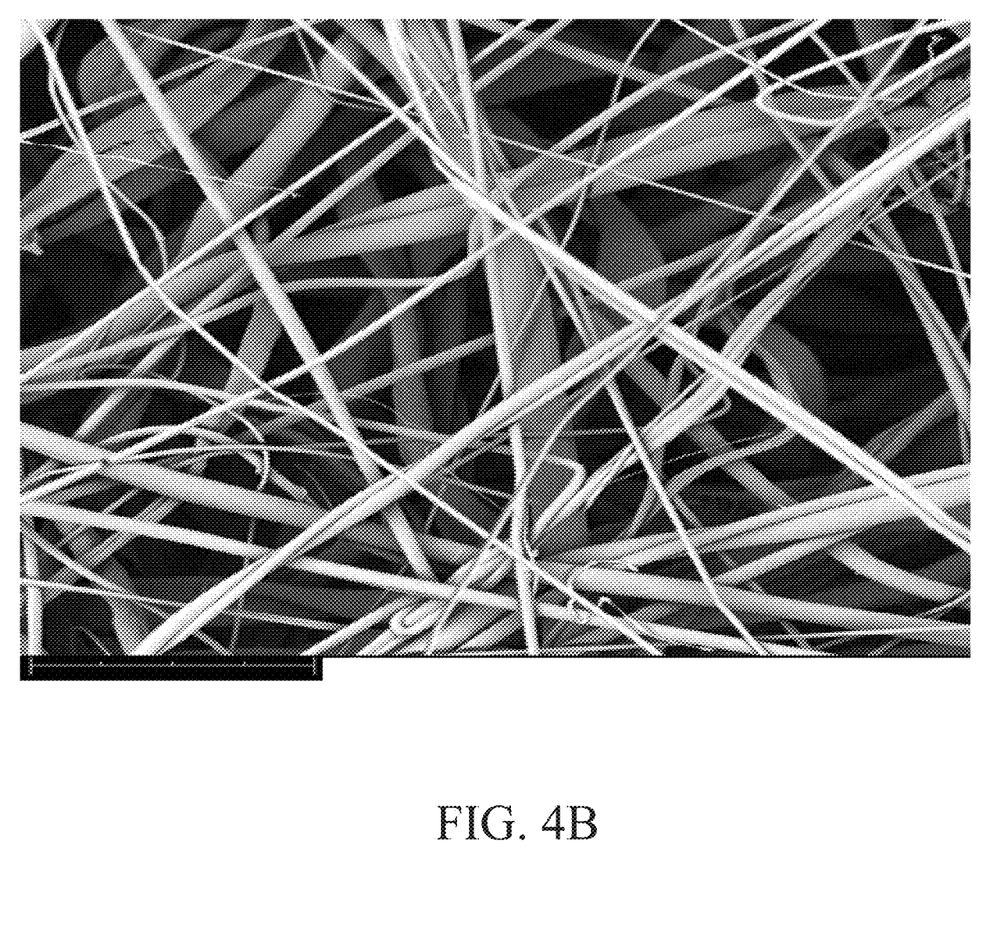
FIG. 4B is a microscopic image of an abrasive layer of meltblown fibers of polylactic acid (PLA) meltblown using an air consumption of 1900 cubic meters per meter per hour ($m^3$/m/hr) and adhered to a cotton base layer. The weight of the base layer was 45 grams per square meter ($g/m^2$) and the weight of the PLA abrasive layer was 15 $g/m^2$. The scale bar in the lower left of the image represents 80 micrometers ($\mu m$).

In some embodiments, an abrasive layer or layers of the presently disclosed composite sheets can be prepared via meltblowing using an air consumption of between about 200 and about 2000 m³/m/hr (e.g., about 200, 300, 400, 500, 600, 700, 800, 900, 1000, 1100, 1200, 1300, 1400, 1500, 1600, 1700, 1800, 1900, or 2000 m³/m/hr). FIGS. 4A and 4B show how the diameter of the meltblown fibers can vary depending upon the air consumption used during the meltblowing process.

In some embodiments, the presently disclosed subject matter provides a composite sheet prepared according to a method of the presently disclosed subject matter. In some embodiments, some or all of the materials of the composite sheet are compostable or biodegradable. In some embodiments, the presently disclosed subject matter provides a wipe, such as, but not limited to, a consumer wipe (e.g., personal care wipe, such as, but not limited to a baby wipe or a facial wipe), a household wipe, an industrial wipe, and/or a medical wipe comprising the composite sheet prepared according to the presently disclosed method. In some embodiments, the wipe is a baby wipe. In some embodiments, the wipe is impregnated with a solution (e.g., a wet wipe). The solution can comprise one or more cleaning, sterilizing, moisturizing, and/or therapeutic agents. In some embodiments, the solution is an aqueous solution. The therapeutic agent can be any suitable agent known in the art to treat a skin condition. In some embodiments, the solution can comprise an alcohol (e.g., ethanol or propanol) or an antimicrobial agent.

In some embodiments, the presently disclosed subject matter provides a composite sheet comprising at least two layers. The two layers can differ in chemical composition and/or fiber structure. In some embodiments, the at least two layers comprise: (a) a base layer comprising a polymeric web, wherein the polymeric web comprises a first polymer; and (b) a first abrasive layer comprising polymer fibers of a second polymer adhered to a first surface of the base layer, wherein the polymer fibers have a diameter ranging from about 0.3 μm and about 20 μm; and wherein the composite sheet is free of an adhesive to adhere the polymer fibers to the base layer.

In some embodiments, the base layer comprises or consists of cellulose (i.e., the first polymer comprises or consists of cellulose). In some embodiments, the cellulose of the base layer can be pulp, lyocell (including fibers sold under the tradename TENCEL™ (Lenzing Aktiengesellschaft, Lenzing, Austria)), cotton, or a blend thereof. In some embodiments, the base layer comprises between about 10 g/m² and about 150 g/m² cellulose. In some embodiments, the base layer comprises between about 25 g/m² and about 55 g/m² cellulose. In some embodiments, the first polymer comprises or consists of a polymer other than cellulose, such as, but not limited to, PLA, PP, PE, PVOH, PCL, PGA, PBS, PHA, PHB, or a copolymer or blend thereof. In some embodiments, the base layer comprises or consists of a compostable or biodegradable polymer or a mixture or blend of compostable or biodegradable polymers.

In some embodiments, the base layer comprises a plurality of bicomponent or multicomponent polymer fibers. The bicomponent or multicomponent fibers can be, for example, in a tipped trilobal, side by side, wedge, islands-in-the-sea, or sheath/core configuration. In some embodiments, the bicomponent or multicomponent fibers can have a diameter of greater than about 0.3 µm and less than about 30 µm (e.g., about 1, 5, 10, 15, 20, 25, or about 30 µm).

In some embodiments, the base layer comprises a nonwoven web. In some embodiments, the base layer comprises a woven fabric, a knitted fabric, or a braided fabric. In some embodiments, the base layer comprises a combination of two or more of a nonwoven web, a woven fabric, a knitted fabric, and a braided fabric.

In some embodiments, the composite sheet further comprises a second abrasive layer comprising polymer fibers (e.g., having a diameter ranging from about 0.3 µm and about 20 µm) of a third polymer adhered to a second surface of the base layer, and wherein the composite sheet is free of an adhesive to adhere the polymer fibers of the second abrasive layer to the base layer. In some embodiments, the second and third polymers are the same. In some embodiments, the second and third polymers are different. In some embodiments, the second and/or third polymers are compostable or biodegradable. In some embodiments, the first and/or second abrasive layer comprise meltblown fibers.

In some embodiments, the second and/or third polymer is selected from the group comprising PLA, PE, PP, PVOH, PVA, PCL, PBS, PHA, PHB, PGA, PB, nylon, a thermoplastic elastomer, or a copolymer or blend thereof. In some embodiments, the second and/or third polymer is selected from the group comprising PLA, PBS, PHA, PCL, PGA, and copolymers and blends thereof. In some embodiments, the second and/or third polymer is PLA.

In some embodiments, the fibers of the first and/or second abrasive layer have a diameter between about 0.3 µm and about 10 µm (e.g., about 0.3, 0.5, 0.7, 1.0, 1.5, 2.0, 2.5, 3.0, 3.5, 4.0, 4.5, 5.0, 5.5, 6.0, 6.5, 7.0, 7.5, 8.0, 8.5, 9.0, 9.5 or about 10.0 µm). In some embodiments, the fibers of the first and/or second abrasive layer have a diameter between about 0.3 µm and about 5 µm. In some embodiments, the first and/or second abrasive layer comprises between about 1 g/m² and about 30 g/m² of the second or third polymer (e.g., about 1, 5, 10, 15, 20, 25, or about 30 g/m² polymer). In some embodiments, the first and/or second abrasive layer comprises between about 5 g/m² and about 15 g/m² (e.g., about 5, 6, 7, 8, 9, 10, 11, 12, 13, 14, or about 15 g/m²) of the second or third polymer.

The first and second abrasive layers can have the same or different levels of abrasiveness. In some embodiments, the first abrasive layer and the second abrasive layer have different levels of abrasiveness. In some embodiments, the diameter of the polymer fibers of the first abrasive layer and the diameter of the polymer fibers of the second abrasive layer are different.

In some embodiments, all the materials of the composite sheet are compostable or biodegradable.

In some embodiments, the composite sheet is impregnated with a solution (e.g., an aqueous solution). In some embodiments, the solution can comprise a cleaning, sterilizing, or moisturizing agent. In some embodiments, the solution can comprise a therapeutic agent known in the art to treat a skin condition. optionally wherein the solution comprises a cleaning agent and/or sterilizing agent. In some embodiments, the presently disclosed subject matter provides a consumer wipe, a household wipe, an industrial wipe, and/or a medical wipe comprising the composite sheet. In some embodiments, the consumer wipe is a personal care wipe, such as, but not limited to a baby wipe or facial wipe.

EXAMPLE

The following EXAMPLE provides illustrative embodiments. In light of the present disclosure and the general level of skill in the art, those of skill will appreciate that the following EXAMPLE is intended to be exemplary only and that numerous changes, modifications, and alterations can be employed without departing from the scope of the presently disclosed subject matter.

Example 1

Cellulose-PLA Composite Sheets

The present example demonstrates the types of structures that can be formed in the manner described herein with controlled fiber size to control the degree of abrasiveness. More particularly, sample composite sheets were prepared by meltblowing PLA onto a cellulose absorbent layer, as described in Table 1, below. In all samples, the throughput was kept constant, but air was modified to control the fiber size. The DCD was set to 200 mm to allow the PLA fibers to adhere to the base cellulose layer.

TABLE 1

Exemplary Cellulose-PLA Composite Sheets.

| Sample ID | Absorbent layer weight (g/m²) | PLA meltblown layer weight (g/m²) | Air (m³/m/hr) | PLA meltblown fiber size range (microns) |
|---|---|---|---|---|
| 3 | 35 | 15 | 800 | 8-17 |
| 6 | 35 | 15 | 1200 | 4.7-9.5 |
| 8 | 35 | 15 | 1900 | 1.5-4 |
| 5 | 35 | 5 | 800 | 3-8 |
| 4 | 35 | 5 | 1200 | 3-10 |
| 7 | 35 | 5 | 1900 | 1.1-4 |
| 10 | 45 | 5 | 300 | 8-12 |
| 9 | 45 | 5 | 800 | 4.7 -18 |
| 13 | 45 | 5 | 1000 | 4-7.4 |
| 16 | 45 | 5 | 1600 | 1.7-4.8 |
| 14 | 45 | 10 | 800 | 7.4-17.7 |
| 17 | 45 | 10 | 1900 | 1.4-8.3 |
| 12 | 45 | 15 | 800 | 12-20 |
| 15 | 45 | 15 | 1200 | 4.0-15.7 |
| 18 | 45 | 15 | 1900 | 1.7-8.0 |
| 20 | 55 | 10 | 300 | 13.7-17.8 |
| 23 | 55 | 10 | 800 | 2.2 14.5 |
| 26 | 55 | 10 | 1900 | 1.3-8.0 |
| 21 | 55 | 15 | 800 | 3.5-19.5 |
| 24 | 55 | 15 | 1200 | 2.3-12.6 |
| 27 | 55 | 15 | 1900 | 2.4-4.5 |
| 22 | 55 | 5 | 1000 | 3.5-9.2 |
| 25 | 55 | 5 | 1900 | 1.3-4.5 |

REFERENCES

All references cited in the instant disclosure, including but not limited to all patents, patent applications, and publications thereof, scientific journal articles, and database entries are incorporated herein by reference in their entireties to the extent that they supplement, explain, provide a background for, or teach methodology, techniques, and/or compositions employed herein.

1. Xiao, L., Wang B., et al. Poly(lactic acid)-based biomaterials: synthesis, modification and applications. InTechOpen.com. January 2012. http://www.intechopen.com/books/biomedical-science-engineering-and-technology/poly-lactic-acid-based-biomaterials-synthesis-modification-and-applications.
2. Sin, L. T., A. R. Rahmat, et al. Polylactic Acid: PLA Biopolymer Technology and Applications. Elsevier Science, Waltham, Mass. 2012.

3. Tsuji, H. Poly (lactide) stereocomplexes: formation, structure, properties, degradation, and applications. Macromolecular bioscience. 2005, 7(5), 569-597.
4. Rasal, R. M., Hirt, D. E. Toughness decrease of PLA-PHBHHx blend films upon surface-confined photopolymerization. Journal of Biomedical Materials Research Part A. 2009, 88(3), 1079-1086.
5. Auras, R. A., L. T. Lim, et al. Poly(lactic acid): Synthesis, Structures, Properties, Processing, and Applications. Wiley, Hoboken, N.J. 2011.

Many modifications and other embodiments of the presently disclosed subject matter will come to mind to one skilled in the art to which this presently disclosed subject matter pertains having the benefit of the teachings presented in the foregoing description. Therefore, it is to be understood that the presently disclosed subject matter is not to be limited to the specific embodiments disclosed and that modifications and other embodiments are intended to be included within the scope of the appended claims. Although specific terms are employed herein, they are used in a generic and descriptive sense only and not for purposes of limitation.

It will be understood that various details of the presently disclosed subject matter can be changed without departing from the scope of the presently disclosed subject matter. Furthermore, the foregoing description is for the purpose of illustration only, and not for the purpose of limitation.

What is claimed is:

1. A method of preparing a biodegradable or compostable composite sheet, the method comprising:
   providing a base layer, wherein the base layer comprises a polymeric web consisting of a first polymer, wherein the first polymer comprises or consists of cellulose, and
   meltblowing a second polymer onto a first surface of the base layer to form a first abrasive layer comprising meltblown fibers of the second polymer, wherein the second polymer is polylactic acid (PLA), wherein the meltblown fibers have a diameter of about 0.3 microns (µm) to about 5 µm, and wherein abrasiveness of the first abrasive layer is controlled by the diameter of the meltblown fibers.

2. The method of claim 1, wherein the method further comprises meltblowing a third polymer onto a second surface of the base layer to form a second abrasive layer comprising meltblown fibers of the third polymer, wherein the third polymer is the same or different than the second polymer, and wherein the meltblown fibers of the second abrasive layer have a diameter of about 0.3 µm to about 20 µm.

3. The method of claim 2, wherein the meltblown fibers of the second abrasive layer have a different diameter than the meltblown fibers of the first abrasive layer.

4. The method of claim 1, wherein the meltblowing is performed using nozzles having a diameter of about 180 µm to about 600 µm and/or a nozzle density of about 10 per inch to about 75 per inch.

5. The method of claim 1, wherein the meltblowing is performed using a die to collector distance (DCD) of about 50 millimeters (mm) to 300 mm.

6. The method of claim 5, wherein the meltblowing is performed at a temperature of about 200° C. to about 300° C.

7. The method of claim 1, wherein the first abrasive layer comprises about 1 grams per square meter ($g/m^2$) to about 30 $g/m^2$ of the second polymer.

8. The method of claim 7, wherein the first abrasive layer comprises about 5 $g/m^2$ to about 15 $g/m^2$ of the second polymer.

9. The method of claim 1, wherein the base layer comprises about 10 $g/m^2$ to about 150 $g/m^2$ cellulose.

10. The method of claim 9, wherein the base layer comprises about 25 $g/m^2$ to about 55 $g/m^2$ cellulose.

11. The method of claim 1, wherein the first polymer is cellulose.

12. The method of claim 1, wherein the cellulose comprises pulp, lyocell, cotton, or a blend thereof.

13. The method of claim 1, wherein the meltblowing of the second polymer is performed using an air consumption of about 1600 $m^3$/m/hr to about 1900 $m^3$/m/hr.

* * * * *